(12) United States Patent
Spiro

(10) Patent No.: US 8,913,323 B2
(45) Date of Patent: Dec. 16, 2014

(54) LOCAL REMOVAL OF A LENTICULAR OPTICAL EFFECT BY A HIGH VOLUME OFFSET COATING

(75) Inventor: Steven M. Spiro, Chappaqua, NY (US)

(73) Assignee: Tracer Imaging LLC, White Plains, NY (US)

( * ) Notice: Subject to any disclaimer, the term of this patent is extended or adjusted under 35 U.S.C. 154(b) by 102 days.

(21) Appl. No.: 13/245,368

(22) Filed: Sep. 26, 2011

(65) Prior Publication Data

US 2013/0033755 A1 Feb. 7, 2013

Related U.S. Application Data

(60) Provisional application No. 61/515,176, filed on Aug. 4, 2011.

(51) Int. Cl.
*G02B 27/10* (2006.01)
*G02B 3/00* (2006.01)

(52) U.S. Cl.
CPC .................................. *G02B 3/0075* (2013.01)
USPC ......................................... 359/619; 359/621

(58) Field of Classification Search
USPC ................... 359/619–633, 455, 463; 353/32; 352/117, 118
See application file for complete search history.

(56) References Cited

U.S. PATENT DOCUMENTS

| | | | |
|---|---|---|---|
| 5,942,062 A * | 8/1999 | Hassall et al. | 156/87 |
| 6,831,787 B1 * | 12/2004 | Scarbrough et al. | 359/622 |
| 6,974,080 B1 | 12/2005 | Goggins | |
| 7,609,450 B2 | 10/2009 | Niemuth | |
| 2001/0029859 A1 * | 10/2001 | Samworth | 101/401.1 |
| 2009/0002818 A1 * | 1/2009 | Iwabu et al. | 359/457 |
| 2010/0214661 A1 | 8/2010 | Spiro | |

OTHER PUBLICATIONS

Office Action mailed Sep. 19, 2011 for the related U.S. Appl. No. 12/142,976.

* cited by examiner

*Primary Examiner* — Thomas K Pham
*Assistant Examiner* — Brandi Thomas
(74) *Attorney, Agent, or Firm* — Leason Ellis LLP

(57) ABSTRACT

A combined use of a pervasively textured anilox supply roll and a customized, locally patterned flexographic roll is provided for forming a lenticular product. The customized, locally patterned flexographic roll includes an intermittent raised and recessed surface pattern analogous to a type used in a "spot" ink application. In the present case, however, the applied material is transparent and preferably matched in its refractive index to the lenticular sheet. Relevant aspects of the invention also register the selectively coated areas with graphic features on the planar reverse side of the lenticular sheet.

20 Claims, 3 Drawing Sheets

LOCAL REMOVAL OF A LENTICULAR OPTICAL EFFECT BY A HIGH VOLUME OFFSET COATING

CROSS REFERENCE TO RELATED APPLICATIONS

The present application claims priority and the benefit of U.S. patent application Ser. No. 61/515,176, filed Aug. 4, 2011, which is hereby incorporated by reference in its entirety. The present application is also related to U.S. patent application Ser. No. 12/142,976, filed Jun. 20, 2008, and U.S. patent application Ser. No. 12/753,133, filed Apr. 2, 2010, each of which is hereby incorporated by reference in its entirety.

TECHNICAL FIELD

The present invention relates to lenticular products and methods of manufacture thereof and, more particularly, to a local surface modification of the patterned relief of a lenticular lens sheet for improving the rendering, readability, and detection of graphics such as (but not limited to) printed imagery, fonts, symbols, fine text, or bar codes (non-interlaced image content), and/or for providing a transparent window in the lenticular product in a local region in which the lenticular effect is nullified to allow underlying material to be visible and readable through the window.

BACKGROUND

As described in the present assignee's previous work, lenticular lenses, or lenticules, are typically cylindrical bodies having longitudinal axes and arranged in a parallel-axis array on a lenticulated face of a lenticular sheet. The face opposite the lenticulated face typically is substantially planar. Seen in cross-section, each lenticule has a vertex distal from the planar face, and adjacent lenticules intersect to define valleys proximal to the planar face. A lenticular height is defined between a first plane tangent to the lenticule vertices and a second plane tangent to the lenticule valleys. A lenticular pitch is defined between axes of adjacent lenticules along a raster axis perpendicular to the axes of the parallel lenticules.

The lenticular sheet typically is formed with a thickness of the sheet being substantially equal to a focal length of the cylindrical lenses or lenticules. The graphic resolution along the raster axis is then limited to the lenticular pitch. In the finished lenticular product, the planar face commonly carries a specially prepared and registered printed image. The image is most usually printed directly to the planar face of the sheet, but may also be formed on a separate substrate, and then aligned and adhered to the planar face.

A tradeoff between quality of focus and viewing angle is well known in the lenticular art. The influence of refractive index is also well understood. Lenticular sheets are often described according to the lenticular pitch in lenses per inch. A 150 lens-per-inch (LPI) array is colloquially understood to be a fine pitch. 75 LPI lens is considered an industry standard. A 40 LPI lens has a relatively coarse pitch, generally used for applications in which the lenticular item is to be viewed at greater than arm's length. The majority of commercial applications are currently served by lenticular sheets having proportions between 1.2 times as thick as the lenticular pitch, to twice as thick as the lenticular pitch. A single lenticule of a 75 LPI lenticular sheet is about 339 microns (13 mils) wide from valley to valley. In its most common present commercial form, a 75 LPI lenticular sheet will have a refractive index of around 1.57 and a thickness of around 469 microns (18 mils), therefore being about 1.4 times as thick as the nominal lens width.

It may be understood that some applications have called for more extreme proportions, as when a thin, conformable lenticular label is required, in which case the proportion may be 1:1 or less. Conversely, superior optical resolving power is often sought after in autostereoscopic "3-D" display, and in this case the ratio of thickness to lens width may be 3:1 or greater. The preceding values descriptions are intended to characterize underlying principles, and identify the most readily available commercial materials in the current trade, and should not in any way be taken to limit the scope of the invention.

Lenticular sheets may be formed by any suitable method. For example, U.S. Pat. Nos. 5,330,799 and 5,554,532 to Sandor et al. describe a lenticular system in which lenses are formed upon a flat carrier sheet in a forming process which is commonly known as "cast film" lenticular. Sandor et al. describe lenses formed in local areas by forming and curing fluid material over the desired image areas.

Within the field of lenticular printing, there are a number of different processes and techniques for performing a printing operation depending upon a number of different factors including the nature of the final product and the intended application. Some of the more common printing processes include offset printing, lithographic printing, etc.

It will be appreciated that there are other types of printing techniques, that are used in different applications beyond the field of lenticular products. For example, one type of printing technique is a printing process which uses an anilox roll. An anilox roll is essentially a specialized gravure roll which has been uniformly engraved with a regular recessed pattern of cavities known as cells. The pattern increases the amount of ink that can be borne by a nonabsorbent roll face. The uniform engraved cells inherently meter the amount of ink taken up by the roll. Retention of the ink within the cells prevents sagging and dripping during or between printing cycles.

Anilox cells are incuse and arrayed in regular patterns of predetermined frequency. They typically have uniform depth and shape as well. The cylinder face may be engraved by mechanical tooling or by laser ablation.

The amount of ink delivered by the anilox roll is determined by the total volume of its cells. Anilox rolls can apply a relatively heavy and relatively uniform ink layer in a single operation. Because the anilox pattern covers the entire roll, they are commonly limited to blanket-coating operations.

Another type of printing process is flexographic printing (flexography). Flexography is a rotary printing method that uses plates of resilient material to print an image that can be received on diverse types of materials. In this process, ink is first transferred through a metered supply roll to the raised relief areas of the printing plate, and thereafter from the raised relief areas to the printed surface.

Because the resilient plate can conform to the receiving material, flexographic printing has long been used in the printing of corrugated cardboard and other irregular surfaces. The relief design in the flexographic plate is commonly generated in a photopolymeric plate material. Radiation exposure through a mask results in selective photopolymerization that ultimately results in a resilient, raised pattern.

The developed flexographic plates are typically then mounted on a printing cylinder. An ink reservoir supplies ink directly to an intermediate ink supply roll. A doctor blade can be electively employed to limit ink film thickness upon the supply roll. Ink is transferred first from the reservoir to the ink supply roll, and then from the ink supply roll to raised areas of the flexographic roll.

The mounted flexographic printing plate is then brought against the receiving medium with sufficient pressure to allow contact between the raised design on the plate and the receiving print medium. The print medium is typically fed between the flexographic roll and an unpatterned backing roll. Printing occurs as the pressure transfers ink from the flexographic plate to the print medium.

Photopolymeric flexographic printing plates can be made of a variety of radiation-sensitive polymer materials. Photosensitive polymer resin plates are available in the trade under the trademarked name CYREL. Various types of CYREL plates are offered by of E.I. DuPont de Nemours and Co., Inc. Development of these photopolymers typically occurs under ultraviolet radiation, but plates may be cured by any suitable source of actinic radiation.

SUMMARY

The present invention discloses the combined use of a pervasively textured anilox supply roll and a customized, locally patterned flexographic roll. The customized, locally patterned flexographic roll includes an intermittent raised and recessed surface pattern analogous to a type used in a "spot" ink application. In the present case, however, the applied material is transparent and preferably matched in its refractive index to the lenticular sheet. Relevant aspects of the invention also register the selectively coated areas with graphic features on the planar reverse side of the lenticular sheet.

BRIEF DESCRIPTION OF DRAWING FIGURES

These and other aspects of the invention are described in the following figures, in which.

Figure 8:
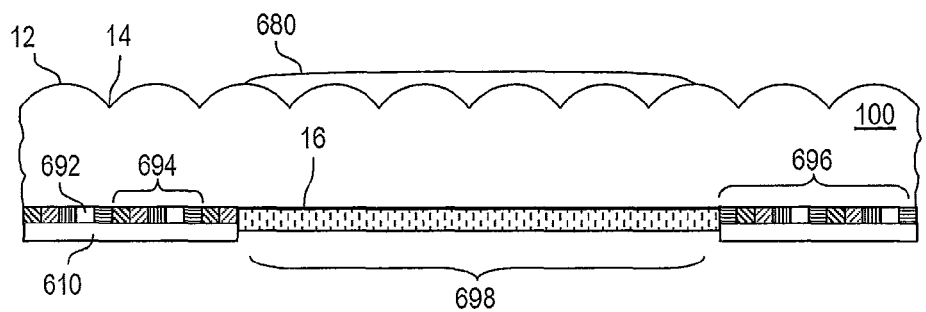
Figure 9:
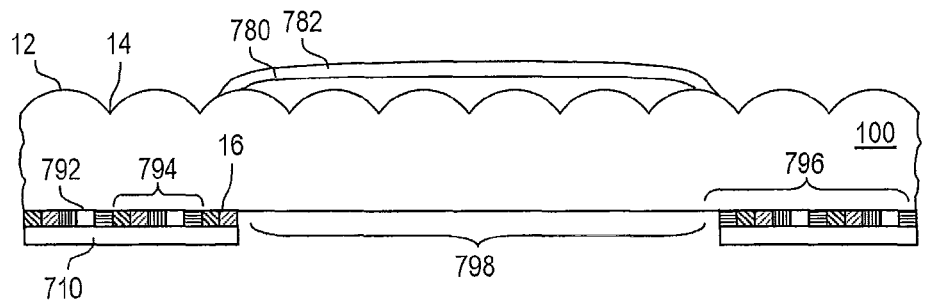

FIG. 8 is a depiction of a lenticular array carrying graphic material which includes both printed interlaced imagery and a tinted transparent region, with the tinted transparent region being in registration on the reverse side with a coated area of the lenticulated face; and FIG. 9 is a depiction of a lenticular array carrying graphic material which includes both printed interlaced imagery and a tinted transparent region, with the tinted transparent region being in registration with and superimposed upon a clear-coated area of the lenticulated face.

DETAILED DESCRIPTION OF CERTAIN RELATED EMBODIMENTS

The present assignee's previous applications addressed a method of selectively depositing a transparent coating material upon a select area of a lenticular lens array (e.g., the '976 application). This approach eliminates the converging effect of the lenses in the selected areas. Finely detailed, non-interlaced graphic material such as text, barcodes, and imagery can be registered with the coated areas as described in detail in the previous applications.

In order to undermine the refractive effect of the lenses, the coating should substantially fill the valleys between the lenses vertices. Generally, in order to substantially fill these valleys, the locally applied transparent coating must have a volume equal to approximately one-half of the volume of the elevated lens relief. The lens relief volume may be determined by various means using the lenses sectional area, the lens radius, the sagitta height and the chord.

In common lenticular practice, in which the sagitta height of the lenticular relief is commonly in the vicinity of 100μ, it may be established that the necessary volume for filling lenticular material would commonly be equal to a planar coating in the range of 20-40μ.

This coating thickness is readily attainable by screen printing, which is commonly used to apply inks from 20μ to 300μ in thickness. However, there are certain drawbacks to using screen printing in this application. First, the apertured screen can leave air inclusions in the applied coating. Materials that alter surface tension, such as detergents or surfactants, can eliminate entrapped air, but usually reduce adhesion as well.

Screen printing is also a relatively slow printing process. Furthermore, the imagery printed on the flat reverse of the lenticular sheets is most economically realized on an offset press. Shipping the lens between a screen printing facility and an offset printing facility can add significantly to the cost associated with the print job. Offset printing facilities typically have an on-site coating capability.

It would therefore be advantageous to arrive at a lenticular coating method whereby a selective coating of suitable thickness, clarity and surface quality could be applied within a facility, coating line, or printing operation that is set up for use with conventional offset printed products. However, lithographic plates typically leave an ink thickness of only 1μ, and flexographic printing plates conventionally lay down an ink thickness of around 6μ. As a result, each of these processes by itself has associated deficiencies that prevent the present objective from being realized.

While multiple passes might in theory be laid down, in practice a thin, repeated ink transfer succeeds only in contacting the peaks of the ribbed lenses. Repeated conventional applications therefore build up coating material upon the already elevated lens vertices, effectively resulting in the opposite of the desired surface-leveling effect.

It will also be appreciated and understood that neither of these existing printing processes is optimal when a relatively heavy, selectively-applied coating is required.

The present invention addresses and overcomes the aforementioned deficiencies and provides an improved, custom printing process for depositing the transparent coating material on the lenticulated surface.

Figure 1:
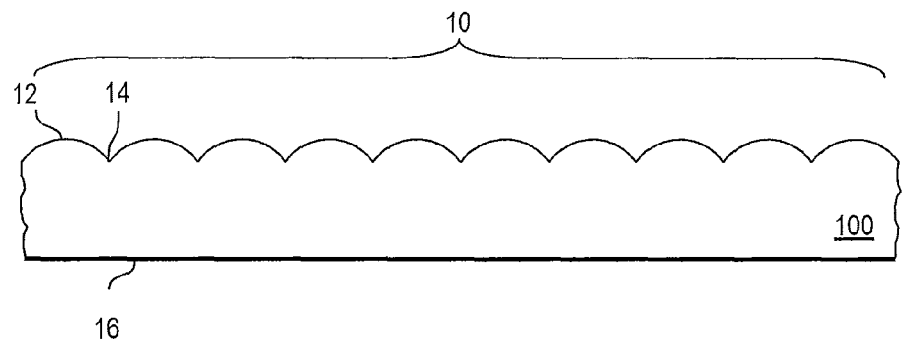
FIG. 1 is a schematic sectional view of an unmodified lenticular sheet used in the printing process of the invention.

FIG. 1 is a sectional view of an unmodified lenticular lens sheet 100. Exemplary lenticular lens sheet 100 includes patterned face 14 defined by lens apertures 10 and cuspated valleys 12. Planar face 16 is substantially flat. While the planar face may readily receive offset printing, offset printing of patterned face 16 would traditionally only result in material being deposited upon the peaks of the lenses. Additional characteristics of exemplary lenticular lens sheets 100 are disclosed in the applications incorporated by reference hereinabove.

The present invention discloses the use of an expressly devised combination of printing technologies to variously and cost-effectively level chosen portions of the lenticular surface through selective, high-volume transfer coating.

Figure 2:
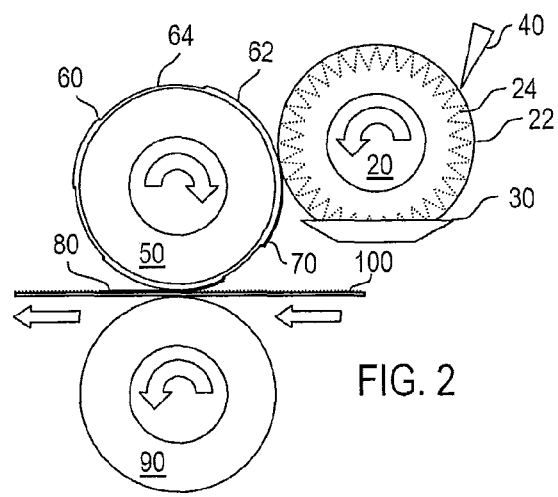
FIG. 2 is a schematic drawing of a single-stage application of the printing process of the present embodiment of the invention.

Referring to the schematic drawing of FIG. 2, an exemplary printing system and process are shown and is based on a number of complementary components. In particular and as described below, the illustrated printing process incorporates and combines anilox type printing with flexography to achieve the above objectives and apply in a controlled manner a coating to select locations of the lenticular product (lenticular lens).

As mentioned above, in an anilox type printing process, an anilox roll 20 carrying an anilox plate 22 picks up a volume of liquid, in this case a transparent liquid coating material, from a source such as ink reservoir 30. As shown, the ink reservoir 30 is positioned in close proximity to the anilox plate 22 such that the anilox plate 22 selectively contacts the liquid that is contained within the reservoir 30.

The liquid coating material is retained in incused cells 24 of anilox plate 22 and therefore, as the anilox plate 22 rotates, a portion of the anilox plate 22 and thus a number of cells 24 are driven into contact with the liquid that is within the reservoir. This results in the liquid being retained in the cells 24.

One other component of the printing system illustrated in FIG. 2 is a flexographic printing component and in particular, the present printing system includes a flexographic roll 50 that carries flexographic plate 60. Flexographic plate 60 includes a plurality of raised and recessed regions, typically in the shape or shapes of a predetermined pattern or image contour (custom local pattern). In the figures, curved arrows indicate the direction of cylinder rotation, and straight arrows connote the print media feed direction. It will be appreciated that the print media can be fed using conventional techniques and equipment, such as an automated conveyor or the like.

Liquid coating materials having viscosities between 1100 cps and 1300 cps have been successfully employed with the plates formed according to the following specifications. While other viscosities may be employed, it may be appreciated that too thin a material will drip unevenly from the anilox roll 20 and bleed along the lens valleys once transferred to the lenticular sheet. Too thick a coating material will fail to transfer to the photopolymeric plate.

The flexographic plate 60 can be a 1.125 mm (0.045") Dupont CYREL Max-D plate having a polyester backing. More generally, the photopolymeric material can range in thickness and may be carried on a polyester or aluminum back, as preferred.

A suitable anilox roll 20 for this application can have a cell volume of 45 BCM (billionths of a cubic meter), a screen count of 80 lines/inch (31.5 lines/cm), and a screen angle of 0°. The anilox cells can be formed in a ceramic coating carried upon a steel cylinder.

The extraordinary volume of material carried in the operation of the present invention can be appreciated in relation to conventional anilox printing practice, in which a heavy, solid ink coat in is commonly applied by a roll having a cell volume of 6 BCM and a screen count of 240 lines/inch (94.5 lines/cm).

Upon contact between the charged anilox roll 20 and a raised region of the flexographic plate 60, liquid coating material 70 is transferred to a selective region, as exemplified here upon raised land 62 of the flexographic plate 60. Coating material is not drawn off anilox plate 22 during the passage of exemplary recessed land 64 relative to the cells of the anilox plate 22. In other words, when a recessed land 64 is placed immediately adjacent the anilox plate 22 during the rotations of the two rolls 20, 50, the coating material does not transfer from the anilox plate 22 to the recessed land 64 as a result of a lack of intimate contact therebetween.

The further rotation of flexographic roll 50 carries the liquid coating material to the lenticulated surface of lenticular lens sheet 100, whereupon it is transferred to and deposited on the lenticulated surface in predetermined coating pattern 80, in cooperation with pressure provided by support roll 90.

Once the anilox roll 20 contacts a raised region (e.g., land 62) of the flexographic roll 50, the anilox cells 24 will be locally depleted of the liquid material. Rotating the anilox roll 20 through a reservoir (e.g., reservoir 30) or through any other charging or metering steps replenishes the cells 24 for another transfer cycle. Similarly, ink carried on the raised lands of the flexographic roll is depleted by the transfer of the liquid coating material to the lenticulated surface. The flexographic roll is in its turn recharged by the replenished anilox roll 20.

The coating material 70 that is used in the example of FIG. 2 can be of a type described herein and/or can be of a type that is disclosed in any of the incorporated by reference applications that are mentioned herein.

Figure 3:
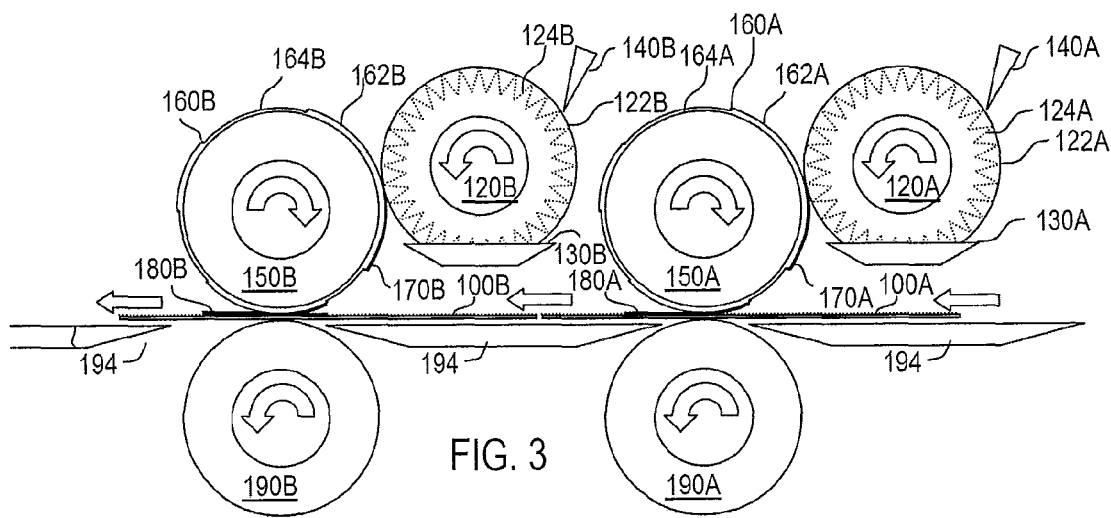
FIG. 3 is a schematic drawing of a dual-stage application of the printing process of the present embodiment of the invention.

A dual station selective coating application is shown in FIG. 3 according to another embodiment of the present embodiment. The dual station system can be used to apply two similar coatings, or, alternately, to apply two dissimilar coatings within the same operational line. Curing may be imparted after each station, or after the combined transfer of the two coating stages, as suits the particular application. It will be appreciated that more than two coating stations can be used as parts of a printing system to successively apply, in series, a number of coatings.

In the arrangement of FIG. 3, a first anilox roll 120A has a corresponding first anilox plate 122A including first set of cells 124A. A first coating material 170A is supplied via a first reservoir 130A that is in selective fluid communication with the first anilox plate 122A and metered by a first blade 140A. First liquid coating material 170A is transferred to a selective region of a first flexographic roll 150A, which carries a first flexographic plate 160A. First flexographic plate 160A includes first flexo plate raised lands 162A and first flexo plate recessed lands 164A. As described in reference to FIG. 2, the portion of the first flexographic plate 160A that is in contact with the first anilox plate 122A represents the portion that receives the coating material from the cells 124A for later application (deposition) on a select region of the lenticular lens. The portion is defined by the raised lands 160A in the illustrated embodiment.

Lenticular sheet is fed into the coating line and is supported throughout by a support structure 194 which can be an automated transporter (conveyor belt or the like). First coating pattern 180A is transferred from the raised lands to first stage lenticular sheet 100A.

Second anilox roll 120B has corresponding second anilox plate 122B including second set of cells 124B. Transparent coating material is supplied via second reservoir 130B and metered by second blade 140B. Second transparent liquid coating material 170B is transferred to a selective region of second flexographic roll 150B, which carries second flexographic plate 160B. Second flexographic plate 160B includes second flexoplate raised lands 162B and second flexoplate recessed lands 164B. This second pair of rolls acts in essentially the same manner as the first pair of rolls.

Second transparent coating pattern 180B is transferred from the raised lands to the lenticular sheet 100 at a second stage and is represented as lenticular sheet 100B. It may be appreciated that two deposits of transparent coating materials can be made in a single operational line or can be done at separate facilities at different times.

One example of a dual coating is when the first coating underfills the valleys that are formed along the lenticular lens as described above and the second coating stage levels the selected area. A second example is when the first coating levels the surface and the second coating stage raises the selected area. A third example is where the first stage levels the selected area and the second coating stage imparts a transparent tint.

Radiation-curable coatings (e.g., UV coatings) have been successfully employed in the practice of the invention. Nevertheless, in certain applications of the invention, it may be useful to use solvent-based coating. For example, a solvent-based coating may be devised to effectively fuse to an amenable lenticular material, such as acrylic (PMMA).

The removal of the lenticular effect can serve diverse goals, and these intentions can imply differing print requirements. For example, the flat, transparent regions can provide a pleasing variation to the lenticulated texture, much in the manner "spot gloss" varnish is used on matte papers. However, a useful aspect of the invention lies in the conscientious use of the locally applied coating with additional graphic features.

Figure 4:
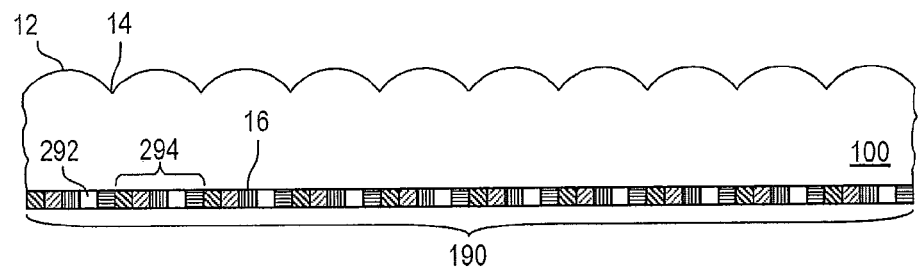
FIG. 4 is a depiction of a lenticular array carrying interlaced graphics in the region shown.

FIG. 4 illustrates a region of a lenticular array sheet carrying only interlaced graphics. Lenticular lens sheet 100 carries a plurality of lens apertures 12 on one face. The lens apertures 12 meet at cuspated valleys 14 in a regular array having a given pitch. Interlaced printing 190 upon planar face 16 includes interlaced views represented in discrete view lines 292, a plurality of which are associated with each lens field 294. The illustration shows five views associated with each lens aperture, but it may appreciated that the illustration is schematic, and the principle of lenticular interlacing may be diversely applied. While a single layer of graphics is depicted here, in practice a printing process would regularly include a plurality of ink applications. Inks may be opaque or transparent and the finished image displayed accordingly.

Figure 5:
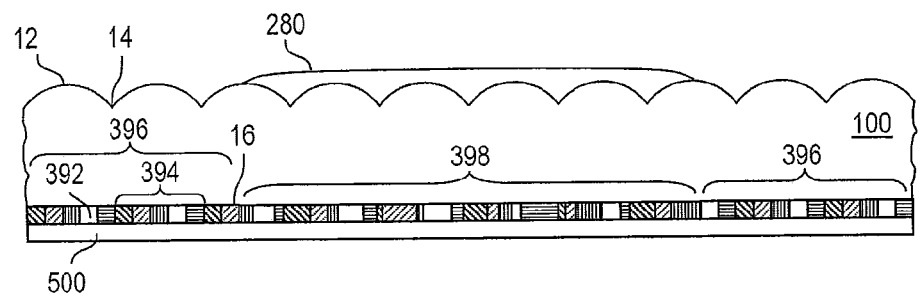
FIG. 5 is a depiction of a lenticular array carrying graphic material which includes both interlaced and non-interlaced graphic regions, with the non-interlaced region being in registration with the coated area.

FIG. 5 shows an area of a lenticular print showing an area applying the principles of the invention. Interrupted interlaced printing 396 includes interlaced view line 392, and local lens field 394. Clear-coated region 280 is conscientiously registered with non-interlaced image content 398 such as barcodes, fine text, or detailed imagery, while upon the same sheet interlaced content is registered with lenticular lenses whose effect is expressly left intact. Alternatively, the clear-coated region 280 is registered with no other matter (such as underlying printed images) in order to define a window through which an object that is below the lenticular product may be seen through.

Because of the spatial coordination of the non-interlaced graphic content and the coated region, the selectively treated areas can display imagery of a resolution that a lenticular printing process would otherwise be unable to deliver. Here, the printed graphics are shown covered with backer layer 500, which can be a white layer, or an otherwise diffuse, opaque or translucent material such as ink or film.

Figure 6:
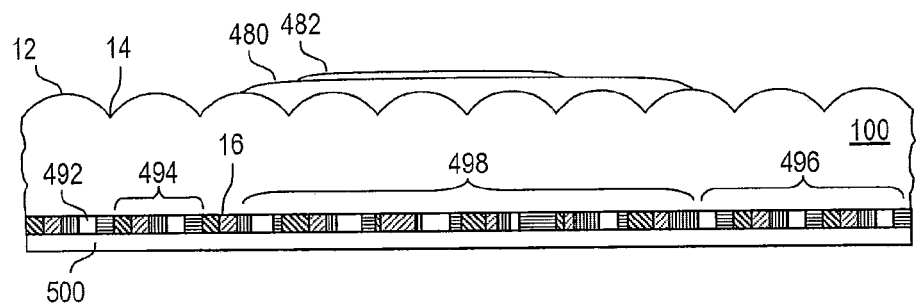
FIG. 6 is a depiction of a lenticular array carrying graphic material which includes both interlaced and non-interlaced graphic regions, and which furthermore includes a transferred appliqué upon the coated area.

FIG. 6 shows a lenticular print product which has been further modified to include a transferred appliqué such as a metallic or holographic foil. Reverse-side printing includes exemplary view line 492 localized lens fields 494, and one or more areas of contiguous intelaced graphics 496. Clear base coat 480 upon the lenticular relief provides a sufficiently planar surface such that transfer 482 can be applied. Transfer 482 can be a thermal foil emblem, but can also use or encompass tinted or opaque ink or other adhesive material. The transfer can graphically coordinate with non-interlaced background graphics 498.

It will therefore be appreciated in view of the foregoing that a secondary printing process can be employed using opaque or tinted pigmented inks on a planar (level) coated (filled) region. In other words, coated (filled) region is initially prepared using a clear coating as described herein and then a secondary coating is applied using a second coating material which is in the form of an opaque ink or a tinted pigmented ink.

Figure 7:
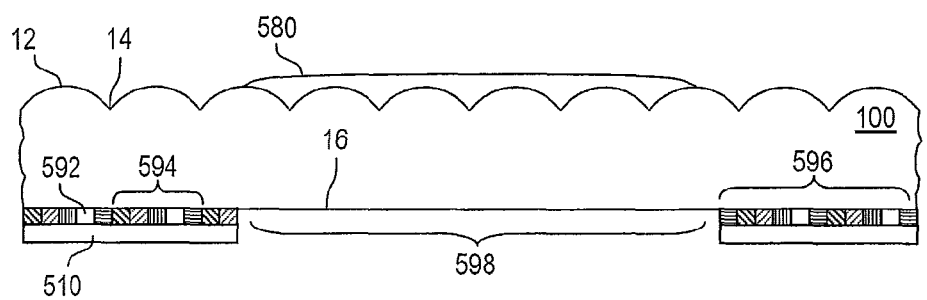
FIG. 7 is a depiction of a lenticular array carrying graphic material which includes both printed interlaced imagery and a transparent region, with the transparent region being in registration with the coated area.

In a further application of the invention shown in FIG. 7, printing on the planar reverse side of the lenticular lens sheet can be arranged to leave one or more unprinted transparent regions 598 in substantial registration with one or more designated coated areas 580 upon the lenticulated relief. As in prior embodiments, regions where the convergent optical effect of the lenticular lenses remains intact are associated with interlaced content 596, dedicated image fields 494, and individual view lines 592. Interrupted backer 510 includes an opening of the same approximate dimension and placement as non-printed transparent regions (voids) 598.

In an additional application of the invention shown in FIG. 8, printing on the planar reverse side of the lenticular lens sheet can be devised to leave one or more tinted transparent regions 698 in substantial registration with one or more clear coated areas 680 upon the lenticulated relief. Analogous to prior embodiments, regions where the convergent optical effect of the lenticular lenses remains intact are associated with interlaced content 696, dedicated image fields 694, and individual view lines 692. Partially open backer 610 includes an opening of the same approximate dimension and placement as clear coated areas 680.

In another application of the invention shown in FIG. 9, tinted overcoating on the face side of the lenticular lens sheet can be devised to leave one or more tinted transparent filter areas 782 in substantial registration with one or more clear coated areas 780 upon the lenticulated relief. Again analogous to prior embodiments, regions where the convergent optical effect of the lenticular lenses remains intact are associated with interlaced content 796, dedicated image fields 794, and individual view lines 792. Open window 798 is disposed in registration with the tinted, coated regions. Windowed backer 710 covers printed areas to be made nontransparent.

Referring now to any of the FIGS. 5 through 9 inclusive, the transparent coating applied either to the lenticular lenses or the planar back of the lenticular sheet can be electively tinted so as to be transparent only to a subset of visible wavelengths. This practice may be employed in various ways. For example, the tinting can be used simply for visual effect. Tinting can also be used as a color filter decoder in a chromatically encoded graphic device.

An example of such a device is when a light green graphic image is overprinted with a distracting red pattern. A red filter superimposed upon that printed image then diminishes the distraction and darkens the green image so that the hidden device is revealed. Use of red and green here is exemplary, and in practice the effect may be realized with various color combinations.

Designs formed according to the invention as shown in FIGS. 8 and 9 are particularly amenable to uses where an even tinting effect is desired. Such filtering devices may be used to decode user status in gaming, promotional, or recreational uses. Such uses may include one or more superimposed printed pieces in the revelation of the encoded graphic device.

It is anticipated that the invention might be applied either in-line or off-line. In an in-line application of the invention, the printing of the image content upon the reverse of the material may be performed upon the same press. However, if the number of inking stations available upon a single press leaves no place for a dedicated spot-coating station, set-up and registration may readily be realized on a second press or coater, or, alternately, in a subsequent operation upon the same printing line. Presses or coaters may configured for sheet-fed or continuous-web operation.

For various foreseeable reasons, it may be preferable to apply the transparent coating in more than one step. Reasons may include considerations of the rate of solvent evaporation, the cure rate of a radiation-curable formula, adhesion, management of volumetric shrinkage, energy use, or environmental concerns.

Adjustments within the invention can include, but are not limited to, the line speed, coating, roll and substrate temperatures, flexographic plate durometer, and the coating formulation. Properties of the coating formulation can include viscosity, surface tension, tint, and refractive index.

In additional variations of the invention, the preceding effects can be combined to provide various esthetic or functional benefits to upon a single sheet of lenticular material. Applications of the invention can be made using different materials and processes within the same sheet. No particular application of the present invention should be taken to imply its use only in exclusion of any other aspect of the invention. Finished sheets or parts can be combined in various graphic assemblies and systems. Diverse post-curing and controlled drying steps are also included within the intended scope of the invention.

In one application, the lenticular products produced using the claimed process can be used in any number of different applications in which a transparent window that does not exhibit a lenticular effect is formed and permits underlying material to be viewed through the window. The coating process of the present invention advantageously provides a process in which an underlying image that is located below and visible through a plurality of stacked products (10, 15, or 20 more lenticular products) is clearly visible. More specifically, 10, 15 or 20 more lenticular products that each incorporates, for example, a 75 LPI lenticular sheet or a 100 LPI lenticular lens sheet. In other words, in one embodiment, when 15-20 lenticular sheets (100 LPI) are disposed on top of one another, an object is still visible through the aligned windows defined by the filled (coated) regions.

While the invention has been described in connection with certain embodiments thereof, the invention is capable of being practiced in other forms and using other materials and structures. Accordingly, the invention is defined by the recitations in the claims appended hereto and equivalents thereof.

What is claimed is:

1. A system for selectively and locally nullifying a lenticular effect of a lenticular lens sheet that includes a back surface and a front lenticulated surface having lenticules defining vertices and valleys therebetween comprising:
 a printing assembly that is configured to deposit a clear coating on a select portion of the front lenticulated surface to define a filled region defined by a first coating material that is formed of a first transparent liquid that at least partially fills at least some valleys of the lenticules, wherein an image is viewable through the filled region without lenticular distortion, the printing assembly comprising:
 a first anilox roll that carries a first anilox plate, the first anilox plate having incused cells formed therein;
 a source of the first transparent liquid, the source being in select fluid communication with the first anilox plate such that first coating material can be captured within the cells; and
 a first flexographic roll that carries a first flexographic plate, the first flexographic plate including at least one raised region and at least one recessed region, the first flexographic roll being disposed proximate the first anilox roll such that the first coating material that is captured within the cells is transferred to the at least one raised region when the cells and the at least one raised region are in registration with one another, the at least one raised region being in select contact with the front lenticular surface in order to transfer the first coating material to the front lenticular surface to form at least a portion of the filled region in which the optical effect of lenticular refraction is substantially annulled;
 a second anilox roll that carries a second anilox plate, the second anilox plate having at incused cells formed therein;
 a source of a second coating material formed of a second transparent liquid, the source being in select fluid communication with the second anilox plate such that second coating material can be captured within the cells; and
 a second flexographic roll that carries a second flexographic plate, the second flexographic plate including at least one raised region and at least one recessed region, the second flexographic roll being disposed proximate the second anilox roll such that the second coating material that is captured within the cells is transferred to the at least one raised region when the second anilox roll and the at least one raised region of the second flexographic roll are placed in selective contact with one another, the at least one raised region subsequently being placed in selective contact with the front lenticular surface in order to transfer the second coating material to the front lenticular surface to form at least a portion of the filled region in which the optical effect of lenticular refraction is substantially annulled.

2. The system of claim 1, wherein the first anilox plate includes a plurality of cells and the first flexographic plate includes a plurality of raised regions and a plurality of recessed regions.

3. The system of claim 1, further including a support roll that is disposed adjacent an in select contact with the back surface of the lenticular sheet.

4. The system of claim 1, wherein the filled region has a first refractive index substantially similar to a second refractive index of the lenticular sheet.

5. The system of claim 1, wherein the first coating material is deposited on a portion of the front lenticulated surface that is less than the entire front lenticulated surface, thereby resulting in adjacent lenticules being free of coating.

6. The system of claim 1, wherein the filled region has a surface that that is substantially tangent to the vertices of the lenticules.

7. The system of claim 1, wherein the back surface has non-interlaced content that is in registration with the filled region.

8. The system of claim 1, wherein the filled region defines a transparent window that is defined through a complete thickness of the lenticular lens sheet to permit an object below the lenticular lens sheet to be viewed.

9. The system of claim 1, wherein the first coating material has a viscosity between about 1100 cps and about 1300 cps.

10. The system of claim 1, wherein the second anilox roll, the source of second coating material and the second flexographic roll are disposed downstream of the first anilox roll, the source of first coating material and the first flexographic roll such that the second coating material is applied to a front lenticulated surface subsequent to the first coating material being applied.

11. The system of claim 1, wherein the first and second coating materials are the same.

12. The system of claim 10, wherein the first coating material underfills the valleys and the second coating materials levels the valleys through the addition of more coating material to select regions that form the filled regions.

13. The system of claim 10, wherein the first coating material is deposited so as to at least substantially fill select valleys and the second coating material is applied thereover so as to define a raised window surface disposed substantially above the vertices of the lenticules.

14. The system of claim 10, wherein the first coating material is deposited so as to at least substantially fill select valleys and the second coating material comprises a transparent tint film.

15. The system of claim 1, wherein the first coating material comprises one of a radiation-curable coating and a solvent-based coating material.

16. The system of claim 1, wherein the back surface includes interlaced printing which is in registration with lenticules that are free of the first coating material.

17. The system of claim 1, wherein the front lenticulated surface includes a plurality of filled regions spaced from one another to define discrete filled regions.

18. The system of claim 1, wherein the back surface includes interlaced image content and non-interlaced image content, the non-interlaced image content being in registration with the filled region.

19. The system of claim 1, wherein the back surface includes at least one tinted transparent region and at least one region of interlaced image content, the at least one tinted transparent region being in registration with the filled region.

20. The system of claim 1, further including a tinted coating disposed over the first coating material that defines the filled region and the back surface includes at least one window and interlaced image content that surrounds the window, the at least one window being in registration with the filled region.

* * * * *